Craig & Woodward,
Sawing Stone.
No. 100,378. Patented Mar. 1, 1870.

Witnesses
Chas. Nida
Alex F. Roberts

Inventors
R. S. Craig
A. H. Woodward
per Munn & Co
attorneys

United States Patent Office.

R. S. CRAIG AND A. H. WOODWARD, OF DOVER, NEW YORK.

Letters Patent No. 100,378, dated March 1, 1870.

IMPROVEMENT IN MACHINE FOR SAWING MARBLE.

The Schedule referred to in these Letters Patent and making part of the same

*To all whom it may concern:*

Be it known that we, R. S. CRAIG and A. H. WOODWARD, of Dover, in the county of Dutchess, and State of New York, have invented a new and useful Improvement in Machines for Sawing Marble and other Stones; and we do hereby declare that the following is a full, clear, and exact description thereof, which will enable others skilled in the art to make and use the same, reference being had to the accompanying drawings forming part of this specification, in which—

Similar letters of reference indicate corresponding parts.

Our invention has for its object to furnish an improved machine for sawing marble and other stone, tapering or upon an incline, which shall be simple in construction and effective in operation, being so constructed and arranged that the sand cannot wear the guide-rollers or their bearings, and so that the stone or marble being sawn may be conveniently shifted or replaced with a new block; and It consists in the construction and combination of various parts of the machine, as hereinafter more fully described.

A is the main frame of the machine.

B is the saw or cradle-frame to which the flexible saws C, one or more, are attached, and which is suspended by the chains D, the lower ends of which are attached to the frame B at or near its corners, and which pass over guide-pulleys attached to the upper parts of the frame A.

The upper ends of the chains D are attached to a drum or shaft, E, which works in bearings attached to the middle part of the top of the frame A, and which may be operated to raise the frame B by a rope and friction-pulleys or other convenient and well-known means.

The inner side of the posts of the frame A are grooved longitudinally to receive the feather or long tenons of the cross-heads of the cross-bars or beams F, so that the said bars or beams F may be raised and lowered as desired.

G are chains, the lower ends of which are attached to the bars F near their ends.

The chains G pass over guide-pulleys attached to the upper parts of the frame A, and their upper ends are attached to the shaft or drum E, so that the cross-beams F and their attachments may be raised and lowered at the same time with the saw-frame B, and by the same operation.

Figure 3:
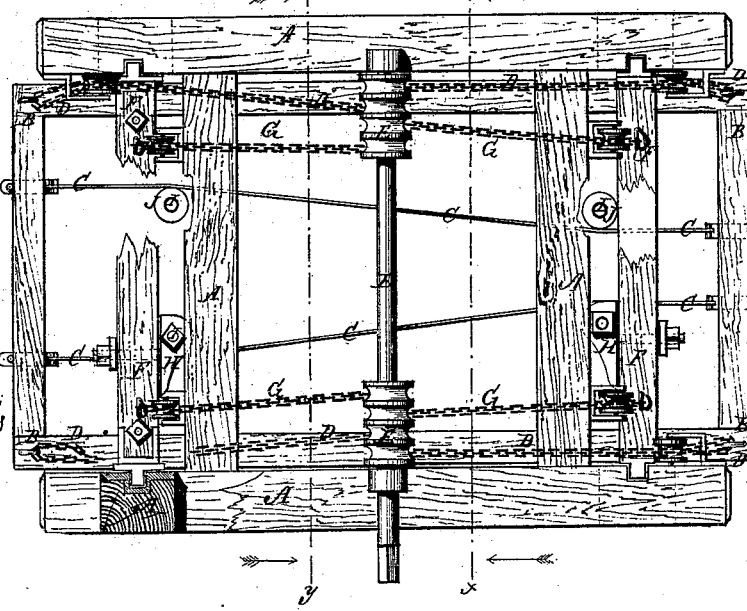
Figure 3 is a top view of the same, parts being broken away, and partly in section through the line $z\,z$, fig. 1, to show the construction.

The cross-beams F are slotted longitudinally to receive the bearings or supports H of the spindles I, which said bearings or supports are formed with a long tenon or feather, to enter the slot of the said beams F, and are secured to said beams when adjusted by bolts and nuts, as shown in fig. 3.

Figure 1:
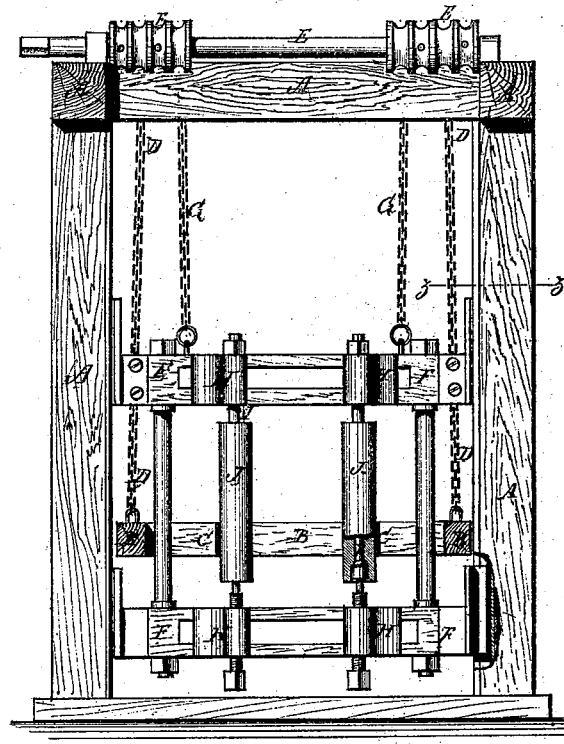
Figure 1 is a vertical section of our improved machine, taken through the line $x\,x$, fig. 3, looking to the left.
Figure 2:
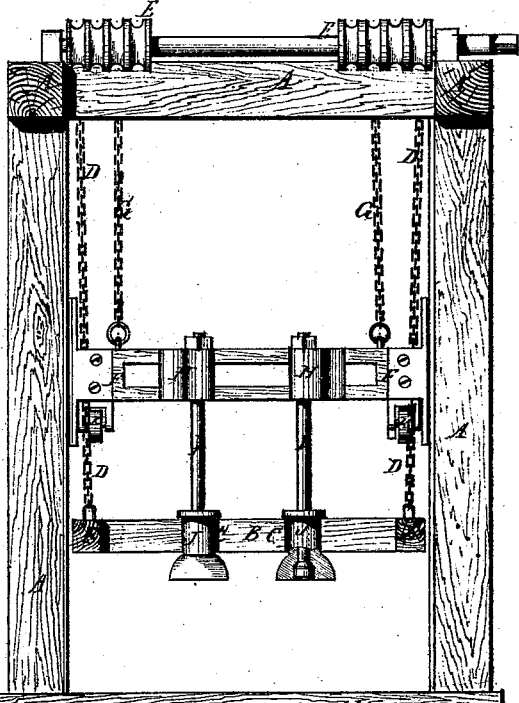
Figure 2 is a vertical section of the same, taken through the line $y\,y$, fig. 3, looking to the right.

The guide-rollers J may be made short, and with a flange upon each end, as shown in fig. 2, or they may be made long and without end-flanges, as shown in fig. 1.

The spindles I are made with an enlargement or head upon their lower ends, which enters an enlargement or countersink in the lower end of the rollers J, so that the bearings of said rollers may be within their bodies, and entirely protected from the sand from the saws.

One cross-beam F may be used for the support of each set of rollers and spindles, as shown in fig. 2, or two beams F may be used, as shown in fig. 1, the lower beam being provided with bearings and set-screws, to support the lower ends of the spindles I.

It will be observed that the guide-rollers J are raised and lowered upon the spindles with the rise and fall of the saws as the saw-frame is swung back and forth.

As the saw cuts its way into the stone, the cross-beams are fed down with the saw-frame, as hereinbefore described, so that the rollers and saws may always have the same relative position.

It should be observed that more saws and guide-rollers may be added to the machine if desired, the saws inclining alternately in opposite directions, so that the entire block may be sawn at one operation.

By this construction the saws, saw-frame, guide-rollers, and cross-beams may all be conveniently and quickly raised out of the way, leaving the lower part of the machine free, for convenience in placing or shifting the blocks in position upon or removing them from the machine.

If desired, the chains G may be omitted, and friction-rollers K attached to the ends of the cross-bars F which rest upon the side-bars of the saw-frame B, so that the spindles and rollers that guide the saws may be supported by the saw-frame B and raised and lowered by and with it.

The particular manner in which the cross-beams F and saw-frame B are connected to each other depends upon the construction of the machine with which our improvements are connected.

Having thus described our invention,

What we claim as our invention, and desire to secure by Letters Patent, is—

The rollers J J, recessed in their lower ends so as to inclose and protect from sand and water the heads H H of the spindles I I, substantially as and for the purpose herein specified.

R. S. CRAIG.
Witnesses:    A. H. WOODWARD.
 FRANK BLOCKLEY,
 JAMES T. GRAHAM.